United States Patent
Wong et al.

(10) Patent No.: US 7,783,601 B2
(45) Date of Patent: Aug. 24, 2010

(54) REPLICATING AND SHARING DATA BETWEEN HETEROGENEOUS DATA SYSTEMS

(75) Inventors: Lik Wong, Union City, CA (US); Thuvan Hoang, Santa Clara, CA (US); Nimar Singh Arora, Union City, CA (US); Jun Yuan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 339 days.

(21) Appl. No.: 11/937,414

(22) Filed: Nov. 8, 2007

(65) Prior Publication Data

US 2009/0125563 A1 May 14, 2009

(51) Int. Cl.
*G06F 17/30* (2006.01)
(52) U.S. Cl. ..................................... 707/635
(58) Field of Classification Search ............... 707/2, 707/200, 635; 709/206
See application file for complete search history.

(56) References Cited

U.S. PATENT DOCUMENTS

| | | | |
|---|---|---|---|
| 5,870,761 A * | 2/1999 | Demers et al. ............... | 707/201 |
| 6,889,231 B1 | 5/2005 | Souder et al. | |
| 7,031,974 B1 | 4/2006 | Subramaniam | |
| 2006/0080394 A1 * | 4/2006 | Goodman et al. ............ | 709/206 |
| 2006/0187836 A1 | 8/2006 | Frey et al. | |
| 2007/0198788 A1 | 8/2007 | Hsien et al. | |
| 2008/0005189 A1 | 1/2008 | Omura | |
| 2008/0027987 A1 | 1/2008 | Arora et al. | |

OTHER PUBLICATIONS

U.S. Appl. No. 11/831,478, filed Jul. 31, 2007, Office Action, Mar. 17, 2010.
Holzher, Steve, "Design Patterns for Dummies", May 8, 2006, John Wiley & Sons, pp. 2-7.

* cited by examiner

*Primary Examiner*—Etienne P LeRoux
(74) *Attorney, Agent, or Firm*—Hickman Palermo Truong & Becker LLP

(57) ABSTRACT

In accordance with an embodiment of the present invention, a heterogeneous data sharing mechanism comprising a capture process and an apply process may be provided in a database system. The capture process mines or receives, at the source entity, a plurality of records that belong to a plurality of transactions. Here, first records from a first transaction in the plurality of transactions are interleaved with one or more records from one or more different transactions in the plurality of transactions. The capture process orders the plurality of records into a stream of ordered records such that all records that belong to a transaction are stored contiguously in a single block of records in the stream. Subsequently, the capture process sends the stream of ordered records from the source entity to the sink entity. Alternatively, the apply process retrieves the stream of ordered records from the capture process.

28 Claims, 10 Drawing Sheets

REPLICATING AND SHARING DATA BETWEEN HETEROGENEOUS DATA SYSTEMS

This application is related to U.S. patent application Ser. No. 11/496,949, entitled "REPLICATING DATA BETWEEN HETEROGENEOUS DATA SYSTEMS", filed by NIMAR ARORA et al. on Jul. 31, 2006, the entire contents of which is hereby incorporated by reference for all purposes as if fully set forth herein.

This application is related to U.S. patent application Ser. No. 11/831,478, entitled "COMBINING CAPTURE AND APPLY IN A DISTRIBUTED INFORMATION SHARING SYSTEM", filed by LIK WONG et al. on Jul. 31, 2007, the entire contents of which is hereby incorporated by reference for all purposes as if fully set forth herein.

FIELD OF THE INVENTION

The present invention relates to database systems and, more specifically, database systems that support information sharing between heterogeneous data systems.

BACKGROUND

Information stored in a data system may be shared with other data systems. To share information, a data mining process may be deployed at a source entity and, correspondingly, an applying process that consumes mined data captured by the data mining process may be deployed at a sink entity. The mined data from the source entity may be propagated (or streamed) to the sink entity by a propagator process. As the processes involved are deployed in different machines and using various inter-processor and/or inter-process communication mechanisms, typically, such information sharing can only be supported by like, if not identical, systems that are developed by the same data system provider. As a result, it is difficult to use such techniques to enable sharing information in a general way between heterogeneous systems. For example, different (or heterogeneous) data systems, sourced from different providers, may use divergent hardware and dissimilar operating systems. Such data systems may use incompatible schemes, system designs, internals, or interfaces that can at best only inter-operate with each other in a very minimal, rudimentary way, thereby precluding an efficient and robust integration for the purpose of sharing information with each other.

While a transparent gateway may be used between heterogeneous data systems to pass standard-based SQL statements instead of directly streaming related data changes, such SQL statements may have to be reconstructed from logs at a source entity and applied at a sink entity in a rather inefficient manner as compared with direct streaming that is available between the like systems. At least one roundtrip is required for each transaction transferred between the entities. In addition, use of the transparent gateway is also limited to data systems that can re-construct and understand SQL statements, and therefore is not applicable to non-database systems (e.g., file systems, application server) that do not use or understand SQL statements.

Another approach for sharing data in heterogeneous data systems is to use a general purpose buffered queue to stage data in a heterogeneous data system, as described in U.S. patent application Ser. No. 11/496,949 ("REPLICATING DATA BETWEEN HETEROGENEOUS DATA SYSTEMS") filed on Jul. 31, 2006, the entire content of which is hereby incorporated by reference for all purposes as if fully set forth herein. However, this approach may suffer from latch contentions among enqueuers and dequeuers, complicated shared memory management, complicated recovery protocol, lack of eager apply (applying transactions before seeing the commit).

Therefore, a better mechanism, which would better support information sharing among heterogeneous data systems, is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
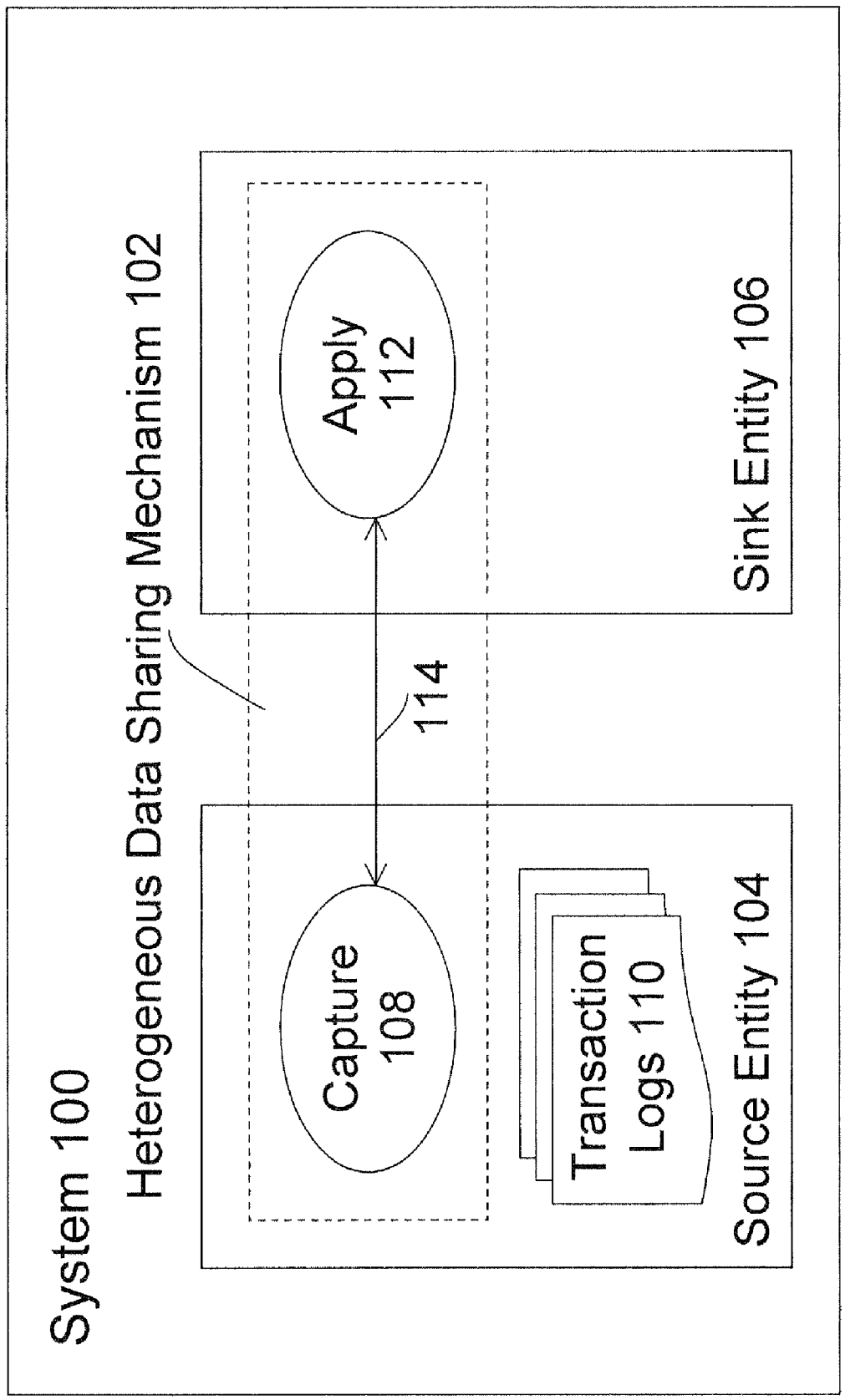
FIG. 1 is a block diagram of an example database system in accordance with an embodiment of the present invention.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Overview

In accordance with an embodiment of the present invention, a heterogeneous data sharing mechanism may be implemented in a system that comprises multiple data systems that may be, but are not limited to, heterogeneous data systems. In some embodiments, the heterogeneous data sharing mechanism may comprise a capture process, which is typically, but is not limited to be, close to a source entity, and an apply process, which is typically, but is not limited to be, close to a sink entity. The capture process and the apply process are logically associated, and directly communicate (through a proxy process in some embodiments), with each other. As used herein, the term "logically associated" or "directly communicate" means that the capture process and the apply process, in addition to sharing data change information, exchange and share overall state information for the heterogeneous data sharing activities conducted between the two processes.

In accordance with an embodiment of the present invention, the capture process may mine log information at a source entity and transfer the mined information to the associated apply process at a sink entity. As the capture process continuously mines and transfers the log information, the apply process continuously reads and consumes the mined log information published by the associated capture process. In particular, the apply process may apply interesting data changes captured (i.e., mined and transferred) from the source entity to corresponding entities at the sink entity.

In accordance with some embodiments of the present invention, while input data to the capture process may comprise interleaved transaction log records, output data by the capture process always comprises an ordered list of transactions. In some embodiments, any partial rollbacks may be eliminated as part of the ordering process. Furthermore, each transaction's records are assembled into its own contiguous record block. In some embodiments, where a transaction comprises an end transaction record at the end, boundaries of transaction log records are provided by end transaction records of the transactions. That is, transaction log records are ordered in such a way by the capture process before handing them to the apply process that these records that belong to a particular transaction are all after an end transaction record of a previous transaction preceding the particular transaction and continue up to an end transaction record of the particular transaction. Therefore, since transaction log records are transferred in a non-interleaving manner between the capture process and the apply process, only end transaction log records of transactions physically carry correlation identifiers in some embodiments.

Transaction log records that are not end transaction records may, but are not required to, physically carry their own correlation identifiers. In some embodiments, these transaction log records (that are not end transaction records) may not carry any correlation identifier (herein "not carry" also include carrying only a null correlation identifier). In some embodiments, if these transaction log records do carry correlation identifiers, they may carry their own correlation identifiers that are different from those assigned to end transaction records. Correlation identifiers that are assigned to transaction log records (including those assigned to end transaction records and in some cases those assigned to transaction log records that are not end transaction records) are incremental as time progresses and can be totally ordered.

The capture process and the apply process may work cooperatively to establish a safe point for log mining in various states such as in an initial startup state, in a steady state, in a process restart scenario, or in other situations. In these embodiments where correlation identifiers are assigned to operations in transactions (at least to the last transaction log records of the transactions), this safe point may be in the form of a particular correlation identifier in logs (for example, transaction logs) to begin mining.

By directly communicating with each other through the logical association, neither the capture process nor the apply process requires a volatile queue that involves complex queue management. Hence, for example, the apply process only needs to acknowledge to the capture process what the last correlation identifier has been applied at the sink entity and the capture process only needs to know the last acknowledged correlation identifier from the apply process in case of any restart. This simplifies operations of recovery protocols between the capture process and the apply process.

In some embodiments where only end transaction records carry correlation identifiers, since transaction log records are contiguous within each transaction and non-interleaving, transaction log records for each such transaction can be retransmitted in its entirely during recovery. On the other hand, if each transaction log record has its own increasing correlation identifiers and if the apply process already consumes a forward portion (e.g., several leading transaction log records) of a transaction, then only trailing transaction log records that are after the forward portion of the transaction need to be retransmitted during recovery. In this manner, streaming of transaction log records between the capture process and the apply process may be replayed (or restarted) from a specified correlation identifier in an efficient manner.

In some embodiments, freed from latch taking that is associated with complex queue management, the capture process and the apply process may take an eager approach in transferring, writing and reading mined information. As a result, under this model, transaction log records can be consumed at a much faster rate than otherwise. Consequently, even if amounts of memory space used to store transaction log records may be the same in both models, processing capacity from the same amount of memory space is much larger in the direct communication model than otherwise.

The mechanism in various embodiments of the invention may be used regardless of the format and data structures used to store the user data. For example, the user data can reside in structures, in any form, such as SQL tables, object-relational tables, files, etc. The mechanism may also be used regardless of the types of user data stored such as basic data types, complex data types, opaque data types, a combination thereof, etc.

Example System

FIG. 1 illustrates an example system 100 that comprises a heterogeneous data sharing mechanism 102 for data sharing between a source entity 104 and a sink entity 106, in accordance with an embodiment of this description.

For the purpose of this invention, the system (100) may be of any type. In an embodiment, for example, the system may be, but is not limited to, a distributed system that comprises multiple database systems. In such a distributed system, the source entity (104) may be a local database system while the sink entity (106) may be a remote database system.

In another embodiment, the source entity may be a database system of type A provided by a vendor A, while the sink entity may be a database system of type B provided by a vendor B. While both type A and type B database systems support database services based on some database standards, those database systems may only be able to communicate with each other in a limited, loosely coupled manner.

In some embodiments, the source entity and the sink entity may be different data systems that store data in entirely different ways. For example, the source entity may be a database system (or a database system cluster) that provides database services to various clients, while the sink entity may be a file system (for example, on a web server) that supports internet-based applications.

Likewise, in a particular embodiment where the source entity and the sink entity are different data systems that store data in entirely different ways, the sink entity may be a database system (or a database system cluster) that provides database services to various clients, while the source entity may be a file system (for example, on a web server) that supports internet-based applications.

For the purpose of the present invention, other data streaming clients and other types of streaming systems are all within the scope of the present invention.

As a part of heterogeneous data sharing mechanism 102, a capture process (also known as a mining process) 108 may be deployed at the source entity 104 to mine information in one or more transaction logs 110 that record operations belonging to a stream of local transactions performed at the source entity. The information mined from the one or more transaction logs (110) may be provided (or transferred) by the capture process (108) to an apply process 112 deployed at the sink entity (106). The apply process (112) is a consumer process for the mined information and may be, but is not limited to, a data replication process, a data storing process, an application server process, etc.

Direct Communication Model

In an embodiment, when initially starting up, the capture process (108) establishes an association 114 with the apply process (112) and starts pushing data to the apply process. Here, association 114 enables the capture process to communicate with the apply process directly (possibly through a proxy in between). For example, as illustrated in FIG. 1, the capture and apply processes may directly communicate state information, log mining information, requests and responses between each other and coordinate the overall heterogeneous data sharing process. This association 114 (that enables direct communication of state information) is in contrast to a publisher-subscriber model where an information producer and an information consumer may not have an association between the producer and the consumer that enables direct communication of each other's state information.

In another embodiment, when initially starting up, the apply process (112) establishes an association 114 with the capture process (108) and starts pulling data from the capture process.

In some embodiments, to provision association 114 between the capture and apply processes, a database administrator sets up configuration files at the source entity and the sink entity to specify any required and/or optional parameters that are to be used by the capture and apply processes for the purpose of establishing the association. For example, IP address or TCP/IP port of corresponding communication parties may be specified. Other parameters including communications and/or application parameters may additionally and/or optionally be specified.

Example Transaction Logs

Figure 2A:
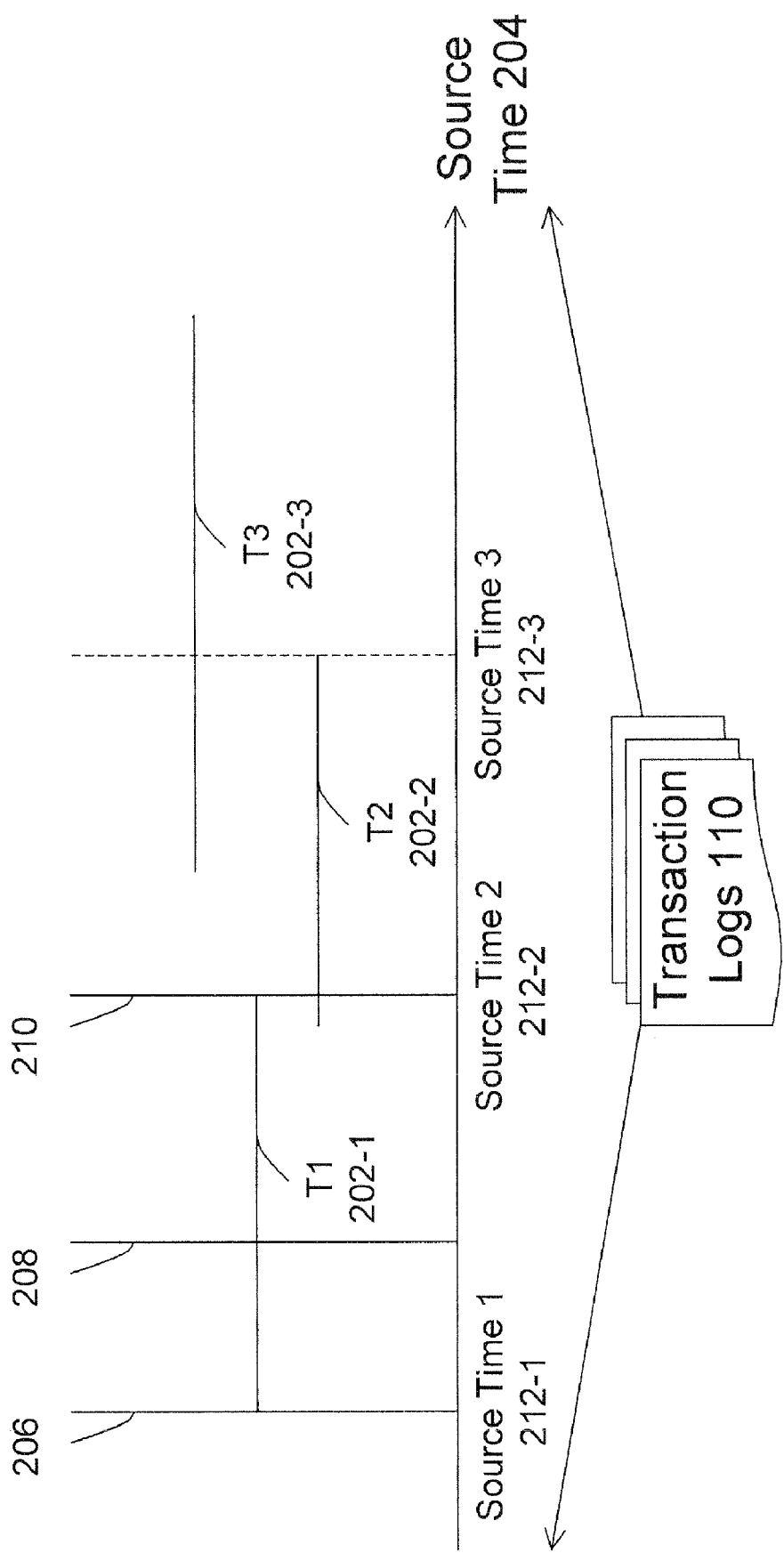
FIG. 2A is a diagram of example transactions that occur at a source entity in accordance with an embodiment of the present invention.

As noted, in some embodiments, the mining of information for the purpose of sharing between (source and sink) entities in a system such as 100 is performed against transaction logs (or journals) such as 110 of FIG. 1. FIG. 2A further illustrates example transaction logs (such as 110 of FIG. 1), in accordance with some embodiments of this description. In an embodiment, transaction logs 110 record a series of transactions that occur at the source entity (104), shown as T1, T2 and T3 (i.e., 202-1 through 3), along a source time (direction) 204.

Here, the term "transaction logs" refers to logs that keep sufficient information (for example, in the form of transaction log records) that may be mined by the capture process (108) for the purpose of heterogeneous data sharing. Types of transaction logs may be, but are not limited to, redo logs kept by a database system, backup files or archives kept by a data system, file system journals kept by a file system, etc. In particular, where transaction logs are redo logs, information in the redo logs may comprise a stream of redo logs that record before and after images of changed rows caused by associated database operations.

As used herein, the term "source time" refers to times taken at the source entity as the data change operations that are recorded in the transaction logs (110) occur at source entity. Specifically, the term "source time" does not necessarily refer to times taken at the source entity as records are read at the source entity by the capture process (108), even if the capture process performs data mining near real time as data change operations associated with the records occur.

As used herein, the term "a transaction" refers to a set of correlated data change operations. Such a transaction may or may not be a database transaction at the source entity or at the sink entity. Furthermore, effects of the correlated data change operations may be different, depending on where they occur. For example, where the source entity is an Oracle database system, a transaction may cause data changes in the source entity in an Oracle-specific way. Alternatively, where the source entity is a DB2 database system, a transaction may cause data changes in the source entity in a DB2-specific way. Likewise, turning to the sink entity, where the sink entity is an Oracle database system, a transaction may cause data changes in the sink entity in an Oracle-specific way. Similarly, where the sink entity is a file system, a transaction may cause data changes in the sink entity in a file-system-specific way.

In some embodiments, correlated data change operations in a transaction may be a set of correlated edit operations made to files stored in a file system. As the correlated edit operations (enter one or more characters; delete some characters, etc.) occurs at the source entity (104), the file system may record (or journal) the correlated edit operations in file system journals.

In some other embodiments, a transaction that comprises a set of correlated data change operations may be a database transaction. Each such correlated data change operation may correspond to a database operation (that acts on data stored at the source entity 104). The database system may record (or journal) database operations in transaction logs. In some embodiments, the transaction logs are redo logs that comprise a plurality of redo records. Each such redo record may store a before image and an after image for each row that has been changed by an associated database operation (for example, an update).

Example Transactions

In some embodiments, a transaction may comprise two or more data change operations. As a result, these data change operations may not all occur at a single time point. Instead, these data change operations may spread over a time period. For example, as illustrated in FIG. 2A, the transaction, T1 (202-1), occurs over a period from a source time 1 (212-1) to a source time 2 (212-2). Similarly, the transaction T2 (202-2) occurs over a period from a time that is some time before source time 2 (212-2) to a source time 3 (212-3).

In particular, as illustrated in FIG. 2A, when occurring at the source entity (104), data change operations from different transactions may be executed concurrently. That is, different time periods over which different transactions occur at the source entity (104) may overlap with each other. For example, as illustrated in FIG. 2A, T1 (202-1) overlaps with T2 (202-2)

along source time 204. Likewise, T2 (202-2) overlaps with T3 (202-3) along source time 204.

Example Transaction Log Records

In some embodiments, a transaction such as T1 may cause several transaction log records (for example, 206, 208 and 210 of FIG. 2A) to be stored in transaction logs 110. The transaction log records may be created and/or appended zero or more times depending on how many data change operations involved in the transaction (T1). In some embodiments, a transaction such as T1 may comprise zero or more savepoints, each of which may comprise one or more data change operations and be independently rolled pack (i.e., partial rollback). For the purpose of illustration, each data change operation may cause a corresponding transaction log record to be created in transaction logs 110. For example, a data change operation at source time 1 (212-1) may cause system 100, or its logging facility, to create a transaction log record 206 as illustrated.

In some embodiments, transaction log records may be of different types. For example, the first transaction log record (e.g., 206) of any transaction (i.e., T1 202-1) may be a start transaction log record. Following the start transaction log record of such a transaction, there may be one or more logical change records (LCRs; for example, 208). At the end of such a transaction, there may be an end transaction log record (i.e., 210). For the purpose of the present invention, all other variations of different types of transaction log records within a transaction are within the scope of the present invention.

In some other embodiments, transaction log records may all be of a same type. In those embodiments, the first transaction log record (for example, 206), any intermediate transaction log record(s) (i.e., 208), and the last transaction log record (i.e., 210) of any transaction (i.e., T1 202-1 in the present example) are of the same type.

It should be noted that source time 204 is not necessarily the (wall) time at which the capture process or the apply process is running, but rather the time when a data change operation occurs at the source entity. Rather, source time 204 represents a segment of past time that is captured by transaction logs 110. In some situations, the capture process may capture transaction log information in near real time. Likewise, in some situations, the capture process and the apply process may share transactional information near real time. That is, information about a transaction is recorded into transaction logs 110 in near real time and the mining and sharing of the information also happen near real time. In such situations, a time at which a data change operation occurs at the source entity (104), a time at which a transaction log record for the data change operation is created in transaction logs 110 at the source entity (104), a time at which the transaction log record is read by the capture process, and a (sink) time at which the apply process consumes the transaction log record at the sink entity (106) may all be very close. In other situations, however, the mining and sharing of the information of transactions may happen far behind the wall time (i.e., source time 204) at which the transactions actually occur at the source entity (104).

Correlation Identifier

In some embodiments, the capture process (108) mines information from transaction logs 110, reads (or turns) the mined information into transaction log records, and then transfers the transaction log records to other communication parties such as the apply process (112). In some other embodiments, the information in transaction logs 110 is already in the form of transaction log records. Thus, the capture process (108) can simply retrieves these transaction log records as appropriate. Therefore, the term "a transaction log record in the transaction logs" may refer to either a transaction log record retrieved from transaction logs 110 or a transaction log record derived from information stored in transaction logs 110.

In some embodiments, each transaction log record in the transaction logs (110) may be assigned its own "unique correlation identifier" that is distinct among all transaction log records including ones in the same transaction. Since the correlation identifier can be used to set the total order of transaction stream shared between the capture and apply processes, in some embodiments, the correlation identifier is encoded in certain format. For example, the correlation identifier may be encoded in base-16 encoding that supports byte comparison.

In some embodiments, transaction log records in the transaction logs (110) may be assigned a unique correlation identifier that is distinct among all transactions but is the same for records in the same transaction. For example, in the embodiments where a transaction comprises a set of correlated edit operations in a file system, each such correlated edit operation that belongs to the same set may be assigned a same correlation identifier. Similarly, in the embodiments where a transaction comprises a set of correlated database operations, each such database operation may be associated with a same unique correlation identifier that is assigned to the transaction.

In some embodiments, only the last transaction records of a transaction is assigned a unique correlation identifier that is distinct among all transactions but all other transaction log records may not carry any correlation identifier.

Example Correlation Identifier

As noted above, in some embodiments, each data change operation in a transaction 202 is assigned a unique sequence number known as a system change number. For example, a new system change number is assigned at the time when a new database operation occurs. In some embodiments, a (valid) system change number is a positive (or unsigned) integer that ranges to very large numbers. In a particular embodiment, system change numbers are assigned in a round-robin manner. That is, once the highest ceiling number for system change numbers is reached, the next system change number is assigned from a number that is close to zero. Various algorithms may be employed in the processes of this description to recognize that a very small system change number may be a later-assigned (thus semantically a greater) number than a few system change numbers with very large numbers.

A single transaction 202 may comprise multiple transaction log records. System change numbers, in some embodiments, may be assigned to these transaction log records in a sequentially and monotonically increasing order as their associated data change operations occur at the source entity (104) along source time 204.

In some embodiments, since both system change numbers (except when they are wrapped around when a very large upper limit such as $2^{32}$ or $2^{64}$ for the system change numbers is reached) and time values of source time 204 increase monotonically, a system change number may logically represent a point of time along source time 204 when the system change number is assigned.

In these embodiments, a system change number assigned to an end transaction log record (such as 210) of a transaction (i.e., T1 212-1) may be chosen as a unique correlation identifier for the transaction (i.e., T1 212-1). Thus, this unique correlation identifier may be associated with each and every transaction log records (i.e., 206, 208 and 210) that belong to the transaction (i.e., T1 212-1).

As noted before, the source entity (104) may have a number of transactions 202 concurrently being processed, such as T1 and T2 as illustrated in FIG. 2A. As a result, transaction log records for a number of transactions that wholly or partly overlap with each other in time may be interleaved in the transaction logs (110). As a further result, the transaction log records associated with different system change numbers may also be interleaved in the transaction logs (110). However, end transaction log records in the transaction logs (110) are in a monotonically increasing order same as their system change numbers are assigned. As a result, in the embodiments where system change numbers for end transaction log records are respectively chosen as correlation identifiers for their respective transactions, these correlation identifiers are in a monotonically increasing order, as their respective transactions are completed along source time 204.

For the purpose of illustration, examples of correlation identifiers have been given as system change numbers. It should be noted that this is for illustration purposes only. For the purpose of the present invention, other types of correlation identifier may be used. For example, instead of system change numbers, byte strings in based 16 format may be used to represent correlation identifiers. Thus, these and other variations in types of correlation identifiers are all within the scope of the present invention.

Contiguous Blocks Received at the Sink

In a steady state, the capture process continuously reads (transaction log) records in the transaction logs (110) in the same sequential order as those transaction log records are written into the transaction logs (110). Correspondingly, the transaction log records are read by the capture process in the same sequential order as data change operations associated with the records occur in time.

In accordance with some embodiments of the present invention, transactions (or their transaction log records) are received at the sink entity (106) by the apply process in the same order as the transactions were completed at the source entity (104). That is, if, at the source entity, a transaction A is completed earlier than a transaction B, then transaction log records that belong to transaction A are received by the apply process earlier than transaction log records that belong to transaction B.

Furthermore, in accordance with some embodiments of the present invention, all transaction log records from a transaction are transferred in a contiguous block that only contains these transaction log records from the transaction. Therefore, transaction log records from various transactions, even though may have been concurrently processed at the source entity, when received at the sink entity by the apply process, are nevertheless not interleaved. In fact, transaction log records from different transactions form distinct blocks each of which is associated with a single transaction. In some embodiments, since data change operations in a transaction are sequentially ordered, transactions contained in a savepoint that has been partially rolled back may be eliminated (or squeezed out) from the stream.

Figure 2B:
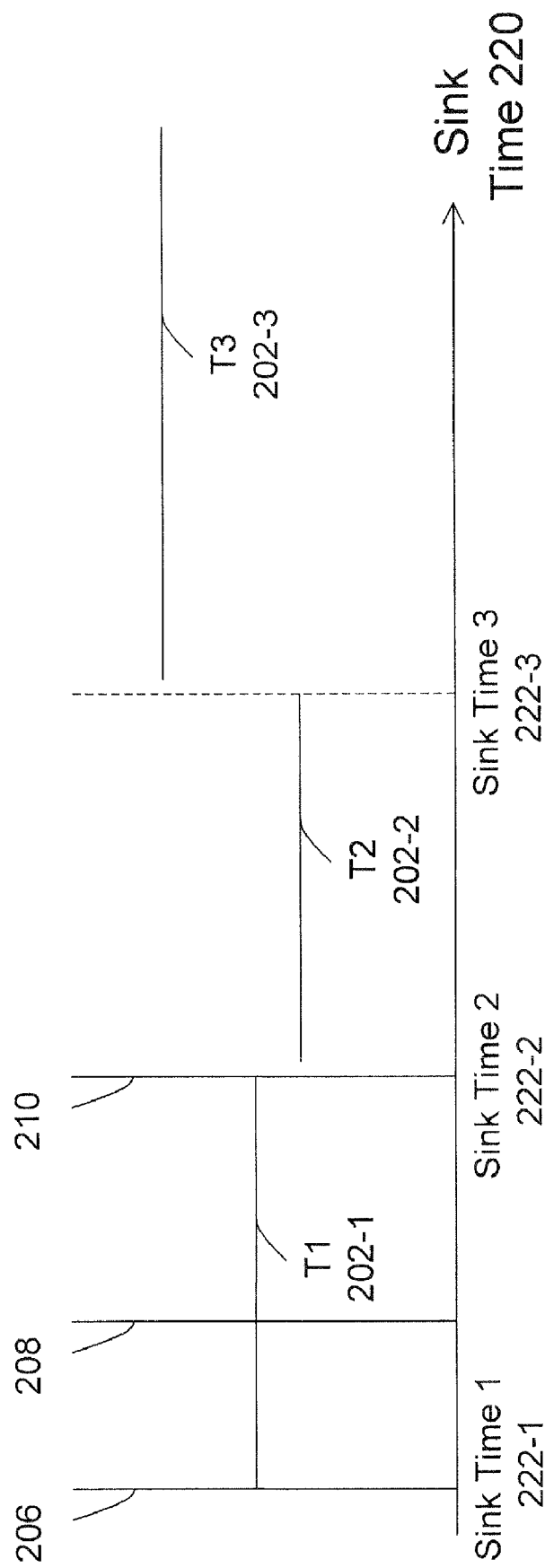
FIG. 2B is a diagram of example transactions that are to be at a sink entity in accordance with an embodiment of the present invention.

As illustrated in FIG. 2B, interesting transactions, such as T1, T2 and T3 (202-1 through 3) that occur at the source entity (104) may be captured and transferred to the sink entity (106).

For the purpose of this description, all transaction log records (e.g., 206, 208 and 210) in such an interesting transaction, say T1 (202-1), may be captured at the source entity and transferred to the sink entity.

For the purpose of illustration, the interesting transactions (i.e., T1, T2 and T3 in the present example) are received at various points of time along a sink time 220. As used herein, the term "sink time" refers to times taken at the sink entity when various transaction log records are received (and, alternatively or optionally, consumed) by the apply process. Since T1 is completed at the source entity before T2, T1 is also received at the sink entity before T2. Likewise, since T2 is completed at the source entity before T3, T2 is also received at the sink entity before T3.

As illustrated in FIG. 2B, transaction log records from different transactions, when received by the apply process, are no longer overlapping. For example, transaction log records that belong to T1 (202-1) are received between a sink time 1 222-1 and a sink time 2 222-2, while transaction log records that belong to T2 (202-2) are received after sink time 2 (222-2). Similarly, transaction log records that belong to T3 (202-3) are received after a sink time 3 (222-3). As illustrated, sink time 3 (222-3) is when T2 (202-2) is completely received at the sink entity by the apply process.

Interesting Transactions

Some of transactions read by the capture process (108) may be determined as interesting transactions. As used herein, the term "interesting transactions" refers to transactions at the source entity (104) that have information about certain data change operations at the source entity (104) such that the certain operations have been specified as interesting to the heterogeneous data sharing mechanism (102). For example, configuration files or rule databases may be used to specify the certain operations on certain tables and/or files as interesting and any transactions comprising these operations are to be determined as interesting transactions.

Having been so determined, the transactions that are considered as interesting are then transferred by the capture process (108) to the apply process (112) in the association in the order as previously described. In a particular embodiment, data changes represented by the transferred transactions may wholly or partially be applied at the sink entity (106).

Data Change Records and End Transaction Records

Data change records are associated with the above-mentioned data change operations. As noted, each data change operation may cause change to one or more database records in the system (100). For example, a data change record in the transaction logs (110) may be associated with an insertion operation that inserts a row in a table in the system (100).

An end transaction log record in the transaction logs records an end of the transaction (for example, 210 of FIG. 2A), such as commit, rollback, abort, etc. Except for commit, the other types of endings of the transaction generally cause the system (100) to rollback any tentative changes that have been made by the operations associated with (or giving rise to) the data change records. In accordance with some embodiments of the present invention, the apply process may maintain a low water mark (lwm) correlation identifier.

In an embodiment, the lwm correlation identifier corresponds to a system change number assigned to an end transaction (i.e., commit/rollback) record of a specific transaction.

Any transaction with an end transaction log record that is assigned a lower system change number than the lwm system change number or assigned a system change number same as the lwm system change number has been fully consumed and committed by the apply process at the sink entity.

In another embodiment where each transaction log record including intermediate transaction log records other than end transaction records has its own unique correlation identifier, the lwm correlation identifier may correspond to a correlation identifier assigned to an intermediate transaction log record of the specific transaction. Therefore, the apply process may send the lwm to the capture process to indicate which transaction log record the apply process has been consuming last. The capture process in turn can identify such a transaction in its mined data and start/re-start transferring transaction log records at a point as indicated by the lwm.

In some other embodiment, the apply process may consume transactions in parallel and out of the end transaction correlation identifier order. The capture and apply process can share this information and avoid re-sending relevant transactions.

Example Memory Structure at the Source

Figure 3A:
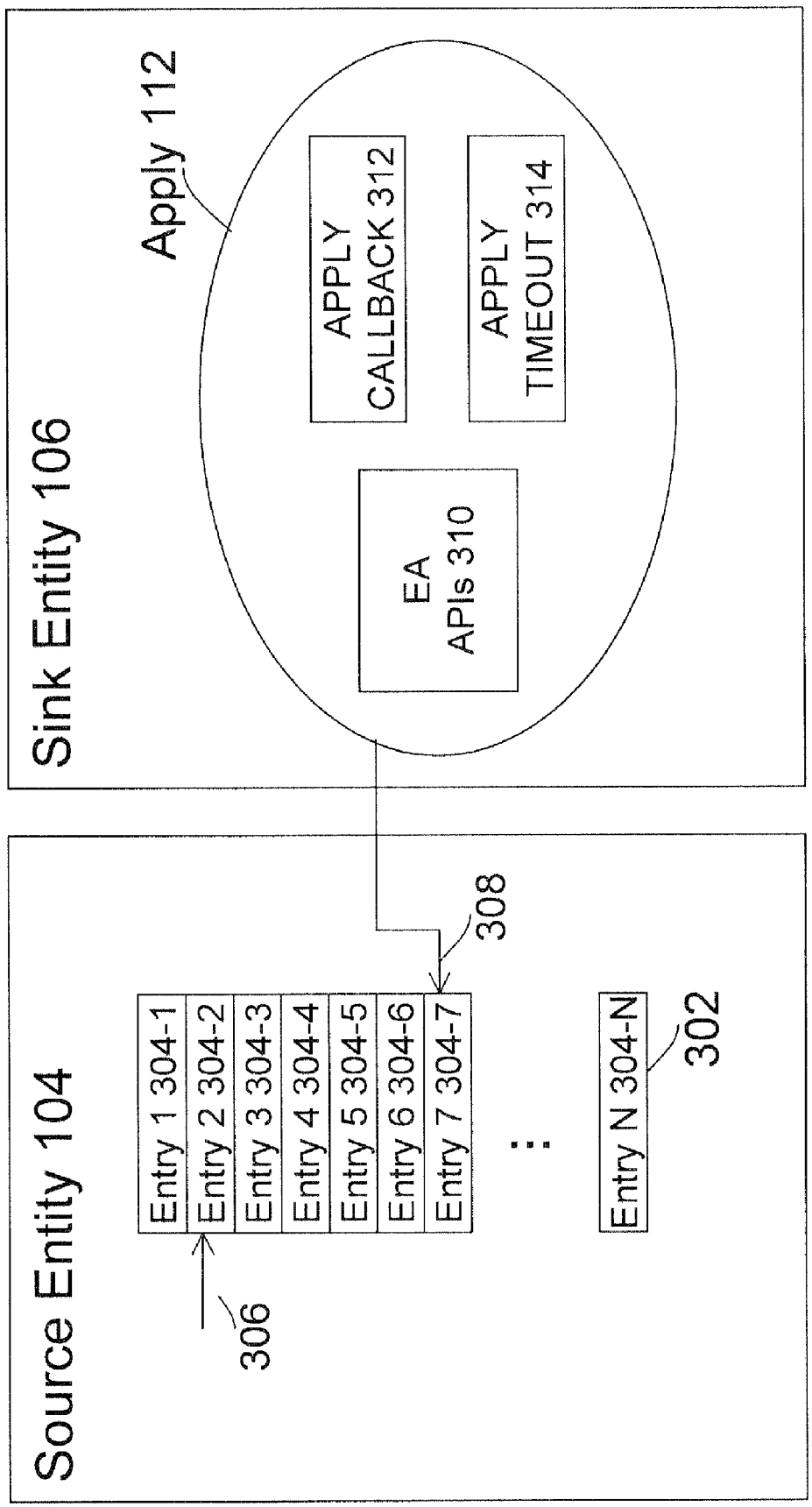
FIG. 3A is a block diagram of an example source entity that comprises an example source memory structure in accordance with an embodiment of the present invention.

FIG. 3A is a block diagram of an example source entity (such as 104 of FIG. 1) that comprises an example source memory structure 302 that is used to store transaction log records received from the capture process and an apply process (such as 112 of FIG. 1) that reads the transaction log records from the source memory structure (302), in accordance with an embodiment of the present invention. In some embodiments, the apply process may use an apply proxy process (not shown) at the source entity (106) to read transaction log records from the source memory structure that has been written to by the capture process (108 of FIG. 1).

In some embodiments, there is no need to take latch for storing and accessing information in the source memory structure (302). As used herein, the term "latch" refers to a mechanism that provides coordination to multiple access requesters to a shared resource. In particular, where a resource is shared among access requesters whose access rights to the resource may conflict, a latch usually needs to be taken (or granted) before any such access requester can access the resource. An example of latch may be a lock, a semaphore, etc.

As illustrated in FIG. 3A, the source memory structure 302 comprises a number of entries 304 (1 through N). In an embodiment, the number (for example, N) of entries 304 is configurable. Each of entries 304 may be used to store a transaction log record. Since a transaction comprises (and are associated with) multiple transaction log records, such a transaction may have zero or more of its associated transaction log records stored in various entries in 304 at a given time. In accordance with some embodiments of the invention, transaction log records from different transactions are not interleaved in the source memory structure (302).

In some embodiments, each of entries 304 contains a field whose value may indicate whether the entry 304 is free or is currently occupied by a transaction log record. In some embodiments, the apply proxy process is the only application process that reads transaction log records from entries 304. Correspondingly, the capture process is the only application process that writes transaction log records to entries 304.

In some embodiments, the capture process maintains a tail pointer 306 that indicates an entry 304, say entry 2 (304-2 as illustrated in FIG. 3A), into which the last records was written. Therefore, when a new transaction log record is to be written into the source memory structure 302, the capture process locates an entry immediately below the entry pointed to by the tail pointer (306). In an embodiment, the capture process may implement a sanity algorithm that determines that the entry below the entry pointed to by the tail pointer (306) is indeed free.

In some embodiments, apply proxy process (not shown in the diagram) maintains a head pointer 308 that indicates an entry 304, say entry 7 (304-7 as illustrated in FIG. 3A), into which a record is currently being read by the apply process. Correspondingly, in an embodiment, when the apply proxy process (112) finishes processing with the record (i.e., 304-7), the apply proxy process moves on to a transaction log record stored in an entry that immediately follows the entry (304-7) pointed to be the head pointer 308. In an embodiment, the apply proxy process (112) may implement a sanity algorithm that determines that the entry below the entry pointed to by the head pointer (306) indeed stores a transaction log record.

In one embodiment, the source memory structure 302 is a circular buffer. Thus, both head and tail pointers may wrap around when entry N is passed. For example, if an entry pointed to by the head pointer is entry N (304-N as illustrated in FIG. 3A), then, after a new transaction log record is received, the capture process determines if an entry that immediately follows entry N is free. Since the source memory structure 302 is a circular buffer, the entry that immediately follows entry N is entry 1 (304-1 as illustrated in FIG. 3A). Therefore, if entry 1 is free, it will be used as the next entry to store the new transaction log record by the capture process.

Likewise, if an entry pointed to by the tail pointer is entry N (304-N as illustrated in FIG. 3A), then, after a transaction log record in such an entry is consumed or processed, the apply proxy process (112) determines if an entry that immediately follows entry N indeed stores a transaction log record. Since the source memory structure 302 is a circular buffer, the entry that immediately follows entry N is entry 1 (304-1 as illustrated in FIG. 3A). Therefore, the transaction log record stored in entry 1 will be next consumed or processed by the apply proxy process (112).

Example Apply

In some embodiments, the apply process (112) implements simple apply application programming interfaces (Apply APIs) 310 that allows streaming of transaction log records from the capture process (108) to the apply process (112) and communicating of state information between these processes. As described above, the streaming of transaction log records may be through the source memory structure (302). Additionally and/or optionally, the streaming may be through the apply proxy process as previously described.

In some embodiments, as will be further explained, the apply process (112) comprises an apply callback processing logic 312 that may be supplied to one of the Apply APIs for actual processing of transaction log records. As illustrated in FIG. 3C, Data Retrieval APIs receive (a batch of) transaction log records sent by the capture process from the source memory structure (302) in block 340. The apply callback processing logic (312) gets a transaction log record from the Data Retrieval APIs and may implement (transaction log record) processing functionality to apply these transaction log records in block 342. In block 344, the apply callback processing logic determines whether the batch has been completely processed. If so, the apply callback processing logic exits the processing of the current batch of transaction log records. Otherwise, the apply callback processing logic continues the processing by returning to block 340. In some embodiments, the Apply API may terminate the processing of transaction log records by the apply callback processing logic (312) after a certain configurable number of transaction log records have been processed. In some embodiments, the Apply API may terminate the processing of transaction log records by the apply callback processing logic (312) after a certain configurable number of transactions have been processed. In some embodiments, the apply process (112) may comprise a apply timeout parameter 314. The apply timeout parameter (314) may be set to a default value or a value configurable by a user. In these embodiments, the apply process (112) may supply the apply timeout parameter (314) along with the apply callback (312) as input parameters when invoking the Apply API. Such an Apply API may set a timer that is to be fired after a time specified by the apply timeout parameter (314) has elapsed since the invocation of the Apply API. Upon the firing of such a timer, the Apply API may terminate the processing of transaction log records by the apply callback processing logic (312).

Example Apply APIs (Apply APIs)

An Apply API—"Attach Apply" API as illustrated in TABLE 1—may be used to attach an apply process such as 112 to a capture process such as 108. The capture process may be named. Such a capture process name may be provided as an input parameter to the "Attach Apply" API when the latter is invoked. This may be used to distinguish multiple capture processes that may be configured at the source entity (104).

TABLE 1

| sword OCIApplyAttach( | |
| --- | --- |
| OCISvcCtx | *svchp, |
| OCIError | *errhp, |
| oratext | *capture_name, |
| oratext | *hwm |
| int | hwm_len); |

A high-watermark (hwm) parameter (with its length hwm_len) is used to indicate the highest correlation identifier the apply process has received. Specifying this value will notify the capture process to send transaction log records from transactions at or higher correlation identifier than the given watermark. If the hwm is zero, then the start of the stream of transaction log records from the capture process will be at a transaction with a correlation identifier that is higher than the capture process's low-watermark (lwm). The lwm is the last correlation identifier of a transaction acknowledged by the apply process as having been received by the apply process at the sink entity.

An Apply API—"Data Retrieval" API as illustrated in TABLE 2—may be used by the apply process to transfer transaction log records from the source memory structure to another entity. This other entity may be a logic module within the apply process, or a separate thread within the apply process, or a process outside the apply process. In some embodiments, the transaction log records may actually be consumed by this other entity, rather than by the apply process.

TABLE 2

| sword OCIApplyGetLCRStream( | |
| --- | --- |
| OCISvcCtx | *svchp, |
| OCIError | *errhp, |
| Oratext | *lwm, |
| int | lwm_len, |

TABLE 2-continued

| OCIApply callbackApplyGetLCRStream apply callbackfp, | |
| --- | --- |
| void | *usrctxp); |

A lwm parameter (with its length lwm_len) can be passed to the capture process for it to maintain its record of this value so it knows where to start sending transaction log records after a restart of either the capture process or the apply process or both. The first call to this API will start the stream of transaction log records at the watermark specified in the "Attach Apply" API. Subsequent calls to this "Data Retrieval" API will continue streaming data from where the capture process left off in a previous call of this API.

The apply process can specify an apply callback processing logic 312, i.e., "apply callbackfp", to be invoked for each transaction log record. The apply process can perform whatever logic it deems necessary for each transaction log record it received, such as, applying the operation as specified therein to a database of the same type as deployed at the source entity, a database of a different type as deployed at the source entity, a non-database data system, database cache, or passing the stream of transaction log records for additional complex filtering, or writing the stream of transaction log records to files, etc.

Within the apply callback processing logic, there may be one or more ways to determine a batch size to process for each invocation of the "Data Retrieval" API. This batch size may be time-based (for example, using an additional apply timeout value—not shown in Table 2). This batch size may be determined by a configurable number of transactions and/or a configurable number of transaction log records. In particular, a sufficiently large batch size may be configured to minimize any roundtrip network latency, especially for wide area network, between the source entity and the sink entity.

An Apply API—"Detach Apply" API as illustrated in TABLE 3—may be used by the apply process to detach from the capture process. A lwm parameter may be supplied to the capture process to update its bookkeeping of the lwm (that may be made persistent by the capture process).

TABLE 3

| sword OCIApplyDetach( | |
| --- | --- |
| OCISvcCtx | *svchp, |
| OCIError | *errhp, |
| Oratext | *lwm, |
| int | lwm_len); |

Example Memory Structure at the Sink

Figure 3B:
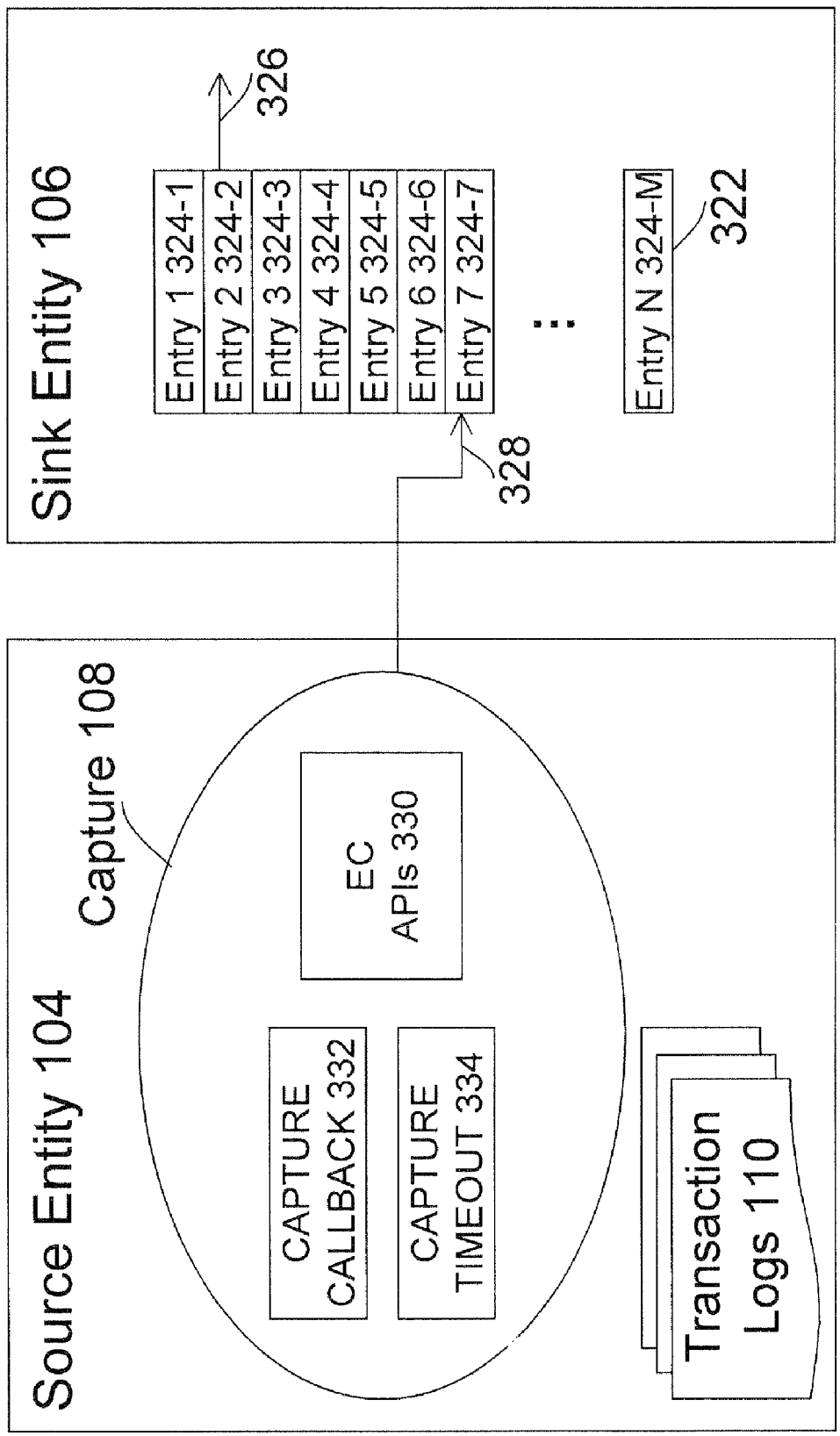
FIG. 3B is a block diagram of an example sink entity that comprises an example sink memory structure in accordance with an embodiment of the present invention.
Figure 3C:
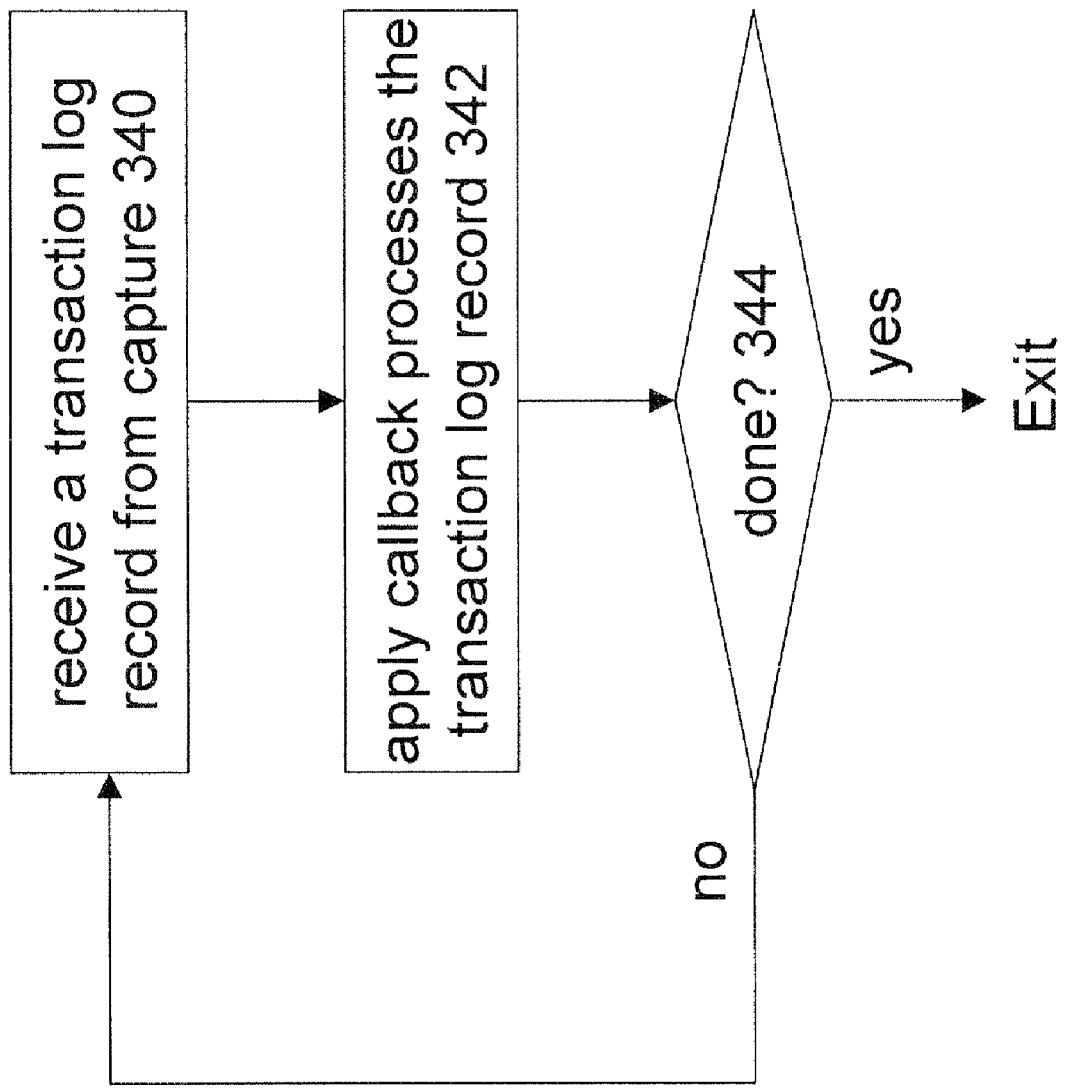
FIG. 3C is an example flow chart of callback processing logic interacting with Data Retrieval APIs in accordance with an embodiment of the present invention.

FIG. 3B is a block diagram of an example sink entity (such as 106 of FIG. 1) that comprises an example memory structure 322 that is used to stored transaction log records captured by the capture process for later transferring to an apply process (such as 112 of FIG. 1), in accordance with an embodiment of the present invention. In some embodiments, the capture process may use a capture proxy process (not shown) at the sink entity (104) to receive transaction log records from the capture process to the memory structure (322) that is read by the apply process (112) at the sink entity (106).

In some embodiments, there is no need to take latch for storing and accessing information in the memory structure (322). Similar to the source memory structure 302 as illustrated in FIG. 3A, the memory structure 322 comprises a number of entries 324 (1 through M). In an embodiment, the number (for example, M) of entries 324 is configurable. Each of entries 324 may be used to store a transaction log record. Since a transaction comprises (and are associated with) multiple transaction log records, such a transaction may have zero or more of its associated transaction log records stored in various entries in 324 at a given time. In accordance with some embodiments of the invention, transaction log records from different transactions are ordered by the capture process (108) before being transferred to the sink and being written to the memory structure (322) at the sink entity. Thus, the transaction log records are not interleaved in the memory structure (322) at the sink entity.

In some embodiments, each of entries 324 contains a field whose value may indicate whether the entry 324 is free or is currently occupied by a transaction log record. In some embodiments, the capture process (or the apply proxy process) is the only application process that writes transaction log records to entries 324. Correspondingly, the apply process is the only application process that reads transaction log records from entries 324.

In some embodiments, the apply process maintains a head pointer 326 that indicates an entry 324, say entry 2 (324-2 as illustrated in FIG. 3B), from which the current records to be read. Therefore, when a new transaction log record is to be read from the memory structure 322, the apply process locates an entry pointed to by the head pointer (326). In an embodiment, the apply process may implement a sanity algorithm that determines that the entry pointed to by the head pointer (306) is not a free entry (i.e., not an entry that is currently not occupied by a transaction log record).

In some embodiments, capture proxy process (not shown in the diagram) maintains a tail pointer 328 that indicates an entry 324, say entry 7 (324-7 as illustrated in FIG. 3B), into which a record was last written by the capture proxy process. Correspondingly, in an embodiment, when the capture proxy process (not shown in the diagram) finishes writing the current record (i.e., in 324-7) and needs to write a new transaction log record, the capture proxy process moves on to an entry that immediately follows the entry (324-7) pointed to be the tail pointer 328. In an embodiment, the capture proxy process (not shown in the diagram) may implement a sanity algorithm that determines that the entry below the entry pointed to by the tail pointer (326) is indeed free.

In one embodiment, the memory structure 322 is a circular buffer. Thus, both head and tail pointers may wrap around when entry M is passed. For example, if an entry pointed to by the head pointer is entry M (324-M as illustrated in FIG. 3B), then, to read the next transaction log record, the apply process determines if an entry that immediately follows entry M is currently occupied by a transaction log record. Since the memory structure 322 is a circular buffer, the entry that immediately follows entry M is entry 1 (324-1 as illustrated in FIG. 3B). Therefore, if entry 1 is currently occupied by a transaction log record, it will be used as the next entry to read a transaction log record by the apply process.

Likewise, if an entry pointed to by the head pointer is entry M (324-M as illustrated in FIG. 3B), then, after a transaction log record is written into the entry, to write the next entry, the capture proxy process (not shown in the diagram) determines if an entry that immediately follows entry M is indeed free. Since the memory structure 322 is a circular buffer, the entry that immediately follows entry M is entry 1 (324-1 as illustrated in FIG. 3B). Therefore, entry 1 will be next used for writing of a transaction log record by the capture process (108).

Example Capture

In some embodiments, the capture process (108) implements simple capture application programming interfaces (Capture APIs) 330 that allows streaming of transaction log records from the capture process (108) to the apply process (112) and communicating of state information between these processes. As described above, the streaming of transaction log records may be through the memory structure (322) at the sink entity. Additionally and/or optionally, the streaming may be through the capture proxy process as previously described.

Figure 3D:
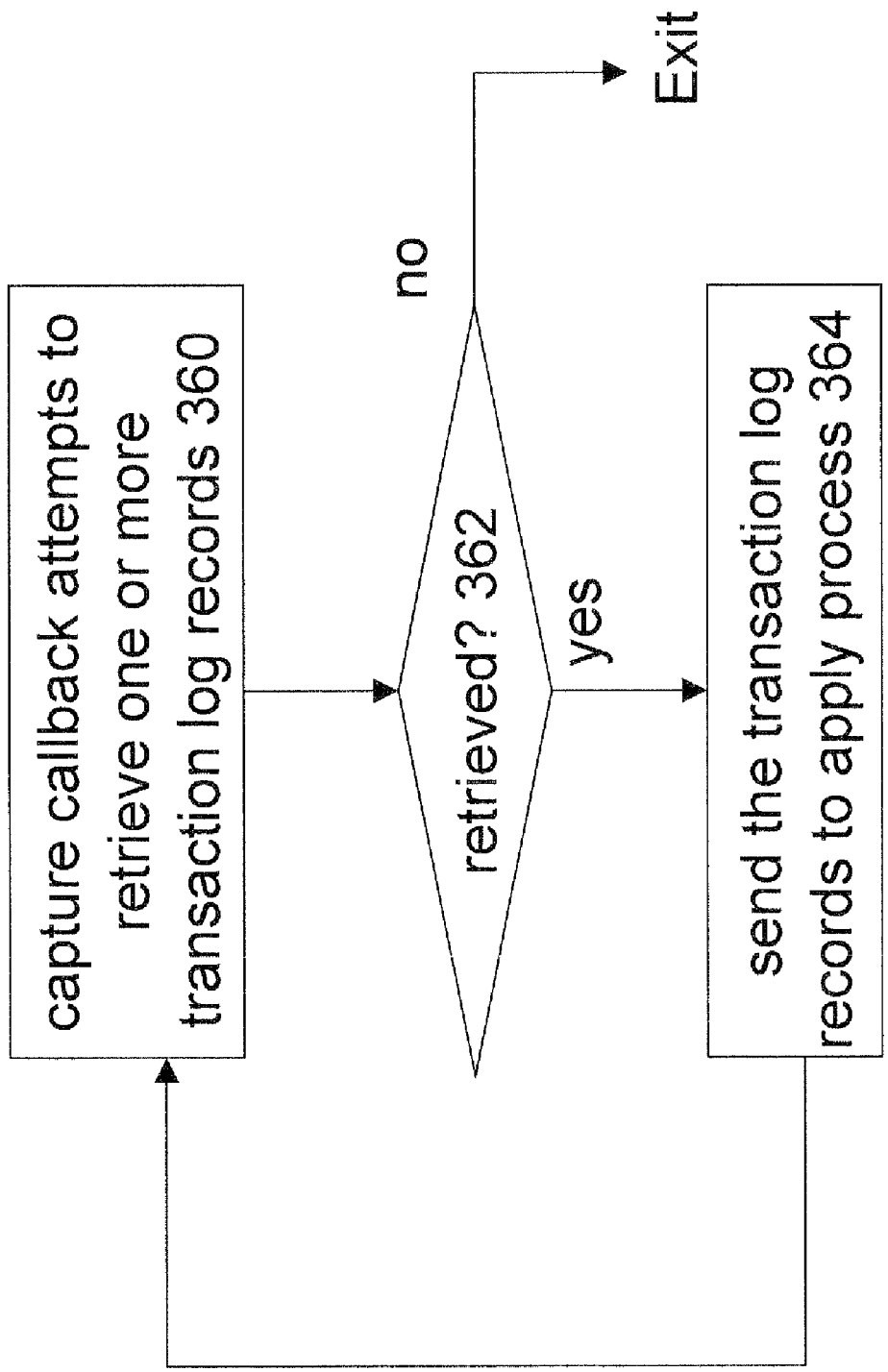
FIG. 3D is an example flow chart of callback processing logic interacting with Data Transmission APIs in accordance with an embodiment of the present invention.

In some embodiments, as will be further explained, the capture process (108) comprises a capture callback processing logic 332 that may be supplied to one of the Capture APIs. This callback processing logic (332) may implement (transaction log record) processing functionality to return a transaction log record for the Data Transmission APIs. As illustrated in FIG. 3D, the capture callback (processing logic) attempts to retrieve one or more transaction records in block 360. In block 362, the capture callback determines whether the transaction log records are retrieved. If so, in block 364, the capture callback, using the Data Transmission APIs, transfer these transaction log records to the apply process at the sink entity, write transaction log records into the memory structure (332), and continues to attempt retrieve more transaction log records in block 360. Otherwise, the capture callback exits (the current attempt to retrieve). In some embodiments, the Capture API may terminate the processing of transaction log records by the callback processing logic (332) after a certain configurable number of transaction log records have been processed. In some embodiments, the Capture API may terminate the processing of transaction log records by the callback processing logic (332) after a certain configurable number of transactions have been processed. In some embodiments, the capture process (108) may comprise a timeout parameter 334. The timeout parameter (334) may be set to a default value or a value configurable by a user. In these embodiments, the capture process (108) may supply the timeout parameter (334) along with the callback (332) as input parameters when invoking the Capture API. Such an Capture API may set a timer that is to be fired after a time specified by the timeout parameter (334) has elapsed since the invocation of the Capture API. Upon the firing of such a timer, the Capture API may terminate the processing of transaction log records by the callback processing logic (332).

Example Capture APIs (Capture APIs)

A Capture API—"Attach Capture" API as illustrated in TABLE 4—may be used to attach a capture process such as 108 to an apply process such as 112. The apply process may be named. Such an apply process name may be provided as an input parameter to the "Attach Capture" API when the latter is invoked. This may be used to distinguish multiple apply processes that may be configured at the sink entity (106).

TABLE 4

```
sword OCICaptureAttach(
    OCISvcCtx        *svchp,
    OCIError         *errhp,
    oratext          *apply_name,
    oratext          ** lwm,
```

TABLE 4-continued

```
    int          * lwm_len,
    oratext      * capture_name,
    ub4          mode);
```

A lwm (low water mark) correlation ID is returned from the apply process. Upon receiving this value, the capture process can send transaction log records from transactions at, or higher correlation identifier than, the given watermark lwm.

A Capture API—"Data Transmission" API as illustrated in TABLE 5—may be used by the capture process to transfer transaction log records into the source memory structure (322).

TABLE 5

```
sword OCICaptureSendLCRStream(
    OCISvcCtx    *svchp,
    OCIError     *errhp,
    oratext      ** lwm,
    int          * lwm_len,
    OCICallbackCaptureSendLCRStream capture_callbackfp,
    ub4          time_out,
    void         *usrctxp);
```

Using the lwm parameter, the capture process retrieves the low water mark from the apply process and knows where to start sending transaction log records after a restart of either the capture process or the apply process or both. The first call to this API will start the stream of transaction log records at the correlation identifier specified in the "Attach Capture" API. Subsequent calls to this "Data Transmission" API will continue streaming data from where the capture process left off in a previous call of this API.

The capture process can specify a capture callback processing logic 332, i.e., "capture_callbackfp" for the "Data Transmission" API to invoke. The capture callback returns a transaction log record for the "Data Transmission" API to transfer this transaction log record to the apply process. The capture process can perform whatever logic it deems necessary before or at the time when each transaction log record is written into the memory structure (322), such as, reading a log, a table, a segment from a database of the same type as deployed at the sink entity, reading the same from a database of a different type as deployed at the sink entity, a non-database data system, database cache, or receiving the stream of transaction log records from other processes, etc.

Within the capture callback processing logic, there may be one or more ways to determine a batch size to process for each invocation of the "Data Transmission" API. This batch size may be time-based (for example, using an additional capture timeout value). This batch size may be determined by a configurable number of transactions and/or a configurable number of transaction log records. In particular, a sufficiently large batch size may be configured to minimize any roundtrip network latency, especially for wide area network, between the source entity and the sink entity.

A Capture API—"Detach Capture" API as illustrated in TABLE 6—may be used by the capture process to detach from the apply process. A lwm parameter may be used to retrieve last acknowledged correlation identifier from the apply process. The capture process can then update its bookkeeping of lwm.

TABLE 6

```
sword OCICaptureDetach(
    OCISvcCtx    *svchp,
    OCIError     *errhp,
    oratext      ** lwm,
    int          * lwm_len);
```

Example Transaction Sequence Diagram

Figure 4:
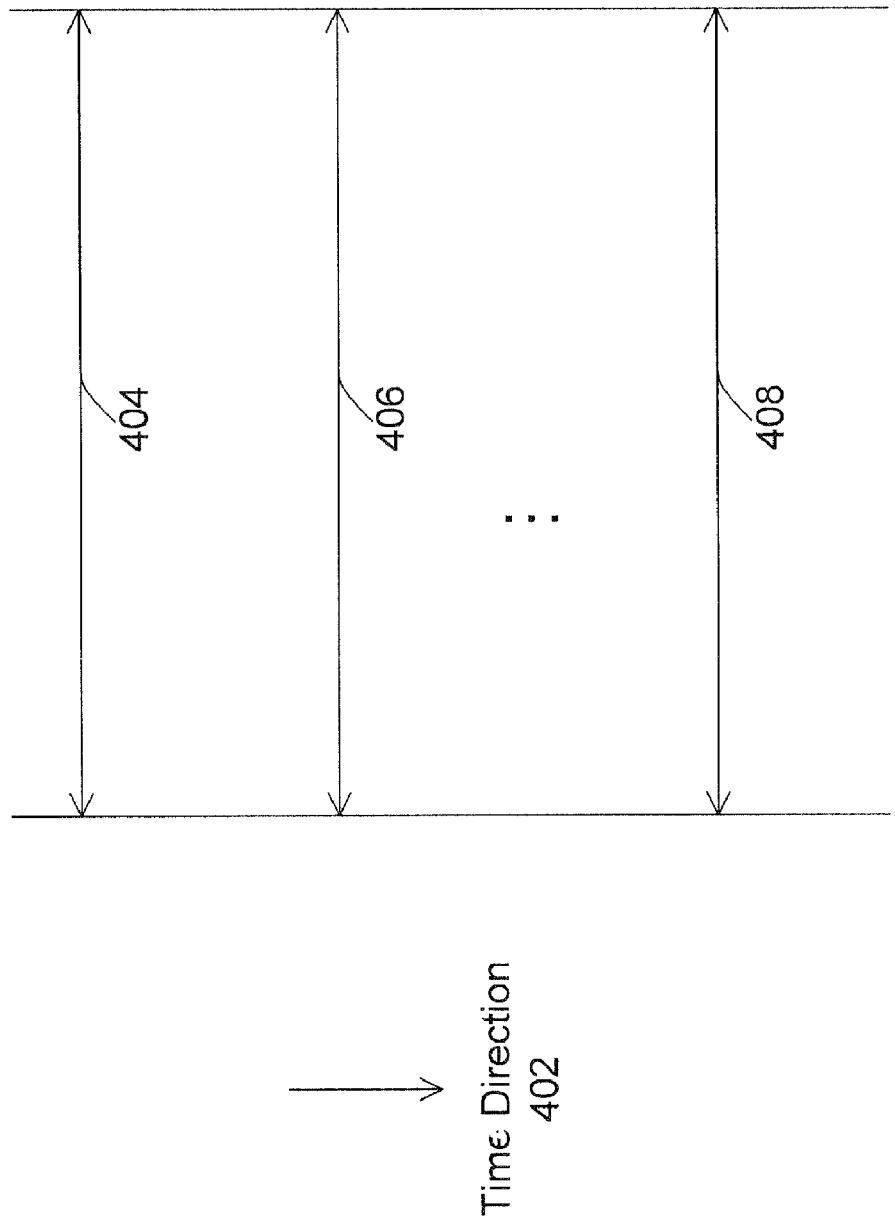
FIG. 4 is an example information sharing session between a capture process and an apply process, according to embodiments of the present invention.

FIG. 4 illustrates a heterogeneous data sharing session between the capture process (108) and the apply process (112) along a time direction 402. Initially, at time 404, the two processes establish an association such as 114 of FIG. 1. In some embodiments as illustrated in FIG. 3A, this association may be established by an (Apply) API such as "Attach Apply" in Table 1. In these embodiments, the apply process invokes the Apply API. On the other hand, in some other embodiments as illustrated in FIG. 3B, this association may be established by a (Capture) API such as "Attach Capture" in Table 4. In these other embodiments, the capture process invokes the Capture API.

Once the association (114) between the capture process and the apply process is established, streaming of transaction log records may be effectuated between the two processes. For the purpose of illustration, at time 406, a transfer of a number of transaction log records may occur between the capture process and the apply process.

In some embodiments as illustrated in FIG. 3A, the apply process may invoke an (Apply) API such as "Data Retrieval" in Table 2 to request a number of transaction log records from the capture process. In these embodiments, the apply process reads these transaction log records requested from the capture process. These transaction log records may have been written in the memory structure (302) by the capture process at the source entity, as previously described.

On the other hand, in some other embodiments as illustrated in FIG. 3B, the capture process may invoke a (Capture) API such as "Data Transmission" in Table 5 to send a number of transaction log records to the apply process. In these other embodiments, the capture process writes these transaction log records to a memory structure such as 322. These transaction log records may be read from the memory structure (302) by the apply process at the sink entity, as previously described.

In accordance with various embodiments of the present invention, transaction log records are written into the memory structures (302 or, alternative, 322) in a contiguous block for each transaction involved. The capture process, or the capture proxy process, orders original interleaved transaction log records and ensures that transaction log records are ordered in a non-interleaved manner when these transaction log records are made available to the apply process or the apply proxy process.

Dots as illustrated in FIG. 4 indicate that this "Data Retrieval" or, alternatively, "Data Transmission" may occur repeatedly and continuously.

Finally, at time 408, the two processes may end the association (114 of FIG. 1) and detach from each other. In some embodiments as illustrated in FIG. 3A, this end of the association may be effectuated by an (Apply) API such as "Detach Apply" in Table 3. In these embodiments, the apply process invokes the Apply API. On the other hand, in some other embodiments as illustrated in FIG. 3B, the end of the association may be effectuated by a (Capture) API such as "Detach Capture" in Table 6. In these other embodiments, the capture process invokes the Capture API. Either API will cause the capture process and the apply process to release resources and perform cleanup functions relating to the heterogeneous data sharing.

Memory Management

Memory management is simple in this direct communication model. Since the capture process sends the changes directly to the apply process (including, but not limited to, memory structures or proxies), shared memory is not required for storing or caching transaction log records in the capture process.

In the direct communication model, there is only one writer (for example, the capture proxy process) and one reader (for example, the apply process). Therefore, in some embodiments, only some sanity algorithms need to be implemented to ensure any occupied entry 304 or, alternatively, 324 not to be overrun and any free entry 304 or, alternatively, 324 not to be taken as an entry that stores an unconsumed transaction log record.

Other than implementing the boundary-guarding sanity algorithms, capture process 108, capture proxy process and apply process 112 may take an eager approach in transferring, writing and reading transaction log records, respectively. For example, in the embodiments as illustrated in FIG. 3A, as soon as capture process 108 receives a new transaction log record through its mining or from another source such as another process, the new transaction log record may be transferred to the sink entity. Thereafter, the capture process does not have to reserve any memory space for this transferred transaction log record. In turn, the capture proxy process may write the new transaction log record into an entry 304 without taking any latch, as long as such an entry is still available in the memory structure 302. Correspondingly, apply process 112 may read and consume the new transaction log record in the entry 304 as soon as it is written, as long as the entry 304 is not a free entry that does not contain an unconsumed transaction log record. Once the new transaction log record is read from the memory structure, the entry that stores the new transaction log record may be immediately marked as free.

Likewise, in the embodiments as illustrated in FIG. 3A, as soon as capture process 108 receives a new transaction log record through its mining or from another source such as another process, the new transaction log record may be written to an entry 324 of the source memory structure (322) at the source entity as long as such an entry is still available in the memory structure 302. Thereafter, the capture process does not have to reserve any other memory space for this transferred transaction log record. In turn, the apply proxy process may read, as soon as it is written, the new transaction log record from the source memory structure (322) without taking any latch and transfer the same to the apply process at the sink entity. Once the new transaction log record is read from the memory structure (322), the entry (324) that stores the new transaction log record may be immediately marked as free.

Therefore, in this direct communication model, the latency caused by latch taking can be avoided. As a result, under this model, transaction log records can be consumed at a much faster rate than under the publisher-subscriber model. Consequently, even if amounts of memory space used to store transaction log records may be the same in both models, processing capacity from the same amount of memory space is much larger in the direct communication model than otherwise.

Process Restarts

In the direct communication model, the apply process may provide to the capture process a specific correlation identifier to start or re-start heterogeneous data sharing at a specific transaction. Even if the capture process and the apply process may restart asynchronously in the middle of a data sharing session, the capture process knows precisely the safe point of restart maintained in an associated apply process. Therefore, in this model, the capture process and the associated apply process may operate in a checkpoint free mode. For example, at the time when the capture process (108) and the apply process (112) reestablish their association 114, the particular correlation identifier (the previously mentioned lwm, for example) can be communicated (or notified) to the capture process (108) by the apply process (112). Upon receiving the particular correlation identifier, the capture process (108) may re-position mining or re-transferring transaction log records from this particular correlation identifier.

Sample Operation

Figure 5:
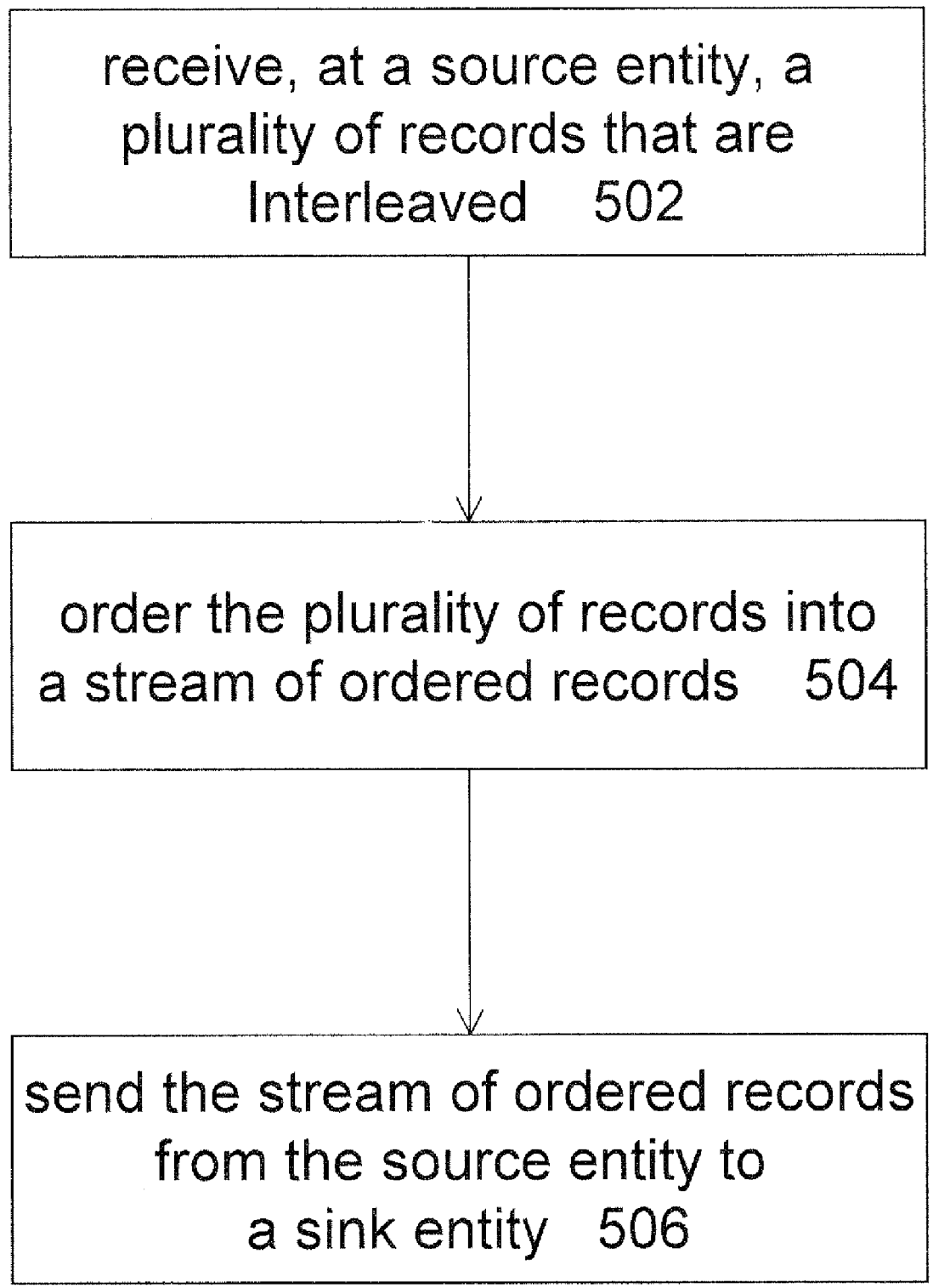
FIG. 5 is an example flow diagram, according to embodiments of the present invention.

FIG. 5 shows a process flow 500 which provides a high level overview of the methodology according to one embodiment of the invention. Initially, in block 502, the capture process (108) receives, at the source entity (104), a plurality of records that belong to a plurality of transactions. Here, the source entity may be a first data system, while the sink entity is a second data system, which may be, but is not limited to, a different type of data system from that of the source entity.

In some embodiments, first records from a first transaction, in the plurality of transactions, are interleaved with one or more records from one or more different transactions, in the plurality of transactions. In some embodiments, the first transaction in the plurality of transactions may be associated with a correlation identifier that is unique among all correlation identifiers that are associated with transactions in the plurality of transactions.

In some embodiments, the first transaction in the plurality of transactions contains an end transaction record, which is assigned with the correlation identifier. In some embodiments, each record (not just an end transaction record) in each transaction in the plurality of transactions may be associated with a correlation identifier that is unique among all correlation identifiers that are associated with records in transactions in the plurality of transactions. In some embodiments, a correlation identifier as discussed above is a system change number.

In block 504, the capture process (108) orders the plurality of records into a stream of ordered records such that all records that belong to a transaction are stored contiguously in a single block of records in the stream. Therefore, the first records from the first transaction will be ordered into a continuous block of records that are no longer interleaved with the one or more records from the one or more different transactions.

In some embodiments, a source memory structure is used to store the stream of ordered record at the source entity. The capture process (108) is the only writer who writes to the source memory structure. Correspondingly, an apply proxy process is the only reader who reads from the source memory structure.

In block 506, the capture process (108) or the apply proxy process sends the stream of ordered records from the source entity to the sink entity. The stream of ordered records may be received at the sink entity by the apply process.

In some embodiments, a sink memory structure is used to store the stream of ordered record at the sink entity. A capture proxy process is the only writer who writes to the sink memory structure, while the apply process is the only reader who reads from the sink memory structure.

In some embodiments, the capture process and the apply process communicate with each other (maybe via a proxy process such as the apply proxy process or the capture proxy process) through a set of routines that implements a set of application programming interfaces (APIs). As used herein, the term "routine" refers to functions, methods in a class, a sequence of instructions that implements particular logic, etc. For example, the capture process and the apply process may communicate with each other through APIs in TABLE 1 through TABLE 3. Additionally and/or optionally, the capture process and the apply process may communicate with each other through APIs in TABLE 4 through TABLE 6.

Through one of the APIs, the apply process may send a request to the capture process, which may comprise a particular, non-zero correlation identifier. In response to receiving this particular correlation identifier, the capture process may send records to the capture process, each of which is associated with a correlation identifier that is no less than the particular correlation identifier provided by the apply process.

The capture process also may send a request to the apply process and retrieve a particular correlation identifier (lwm) from the apply process. Consequently, the capture process may send records to the apply process such that each of the records is associated with a correlation identifier that is no less than a particular correlation identifier contained in an acknowledgment that the capture process last received from the apply process.

In some embodiments, because the capture and the apply processes establish a safe point for data mining as described above by indicating where a present position of records should be used, the capture process may avoid taking checkpoints when capturing records from one or more logs at the source entity.

For the purpose of illustration, the mining process, i.e., the capture process, has been described as located at the source entity. It should be noted that this is for illustration purposes only. For example, such a capture process can also run in another entity other than the source entity. In particular, an entity separate from the source entity and the sink entity may be designated as a mining entity. The transaction logs in the source entity may be shipped to the mining entity. The capture process running at the mining entity may mine the transaction logs received from the source entity and sends interesting changes to the sink entity. In addition, the sink entity may be the same as the mining entity. Thus, these and other variations of where the transaction logs are mined are within the scope of this description.

For the purpose of illustration, it has been described that, when a transaction log record is consumed, the transaction log record is also applied to (the database system) at the sink entity. Furthermore, it has been described that the consumption of a transaction log record occurs at the time when the transaction log record is removed from the memory structure. It should be noted that this is for illustration purpose only. For the purpose of this description, other meanings of the term "consumed" may also be appropriate in various embodiments.

Hardware Overview

Figure 6:
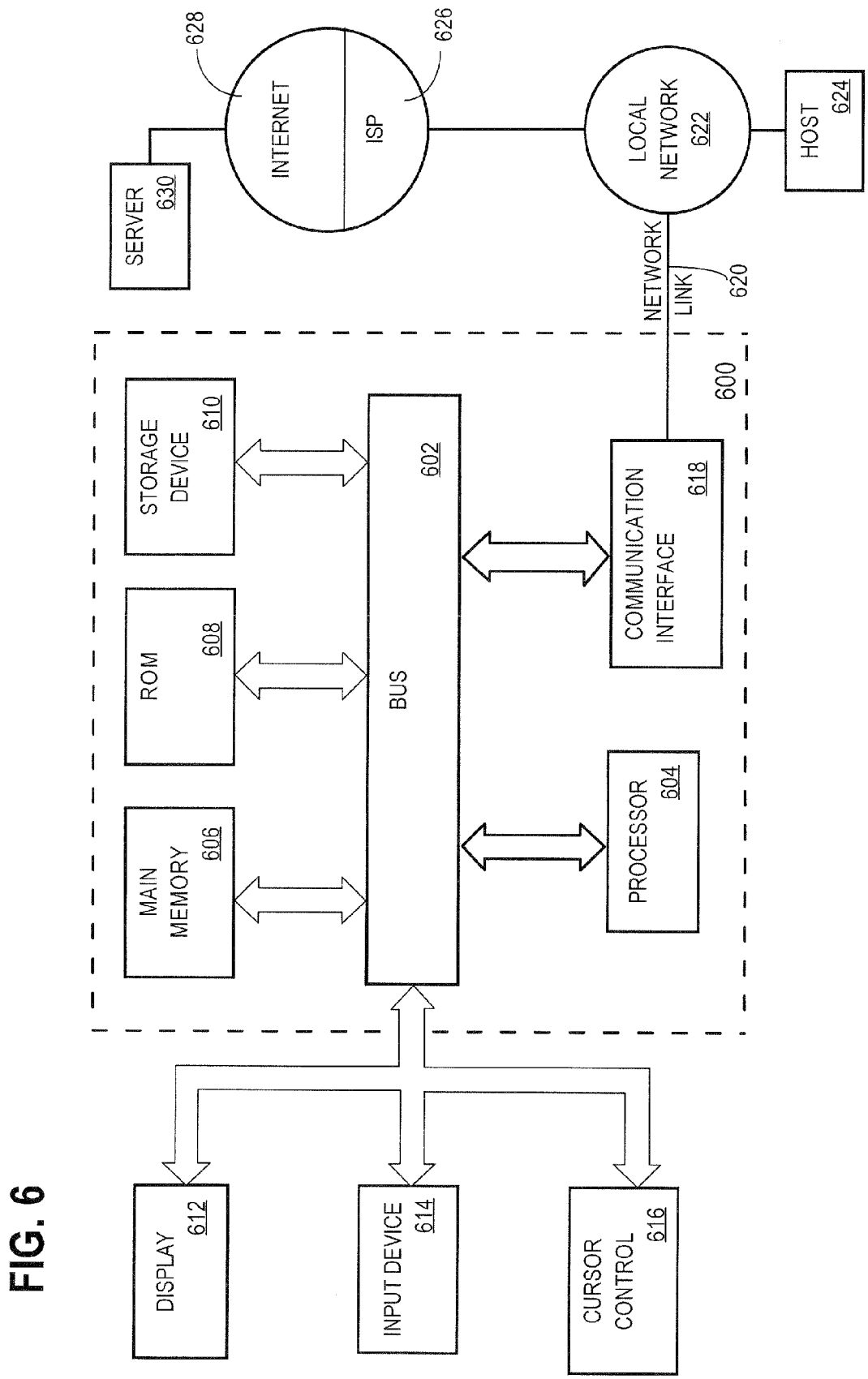
FIG. 6 is a block diagram of a system upon which the techniques described herein may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for propagating change records from an source entity to a sink entity, comprising:

receiving, at the source entity, a plurality of records that belong to a plurality of transactions, wherein first records from a first transaction in the plurality of transactions are interleaved with one or more records from one or more different transactions in the plurality of transactions;

ordering the plurality of records into a stream of ordered records such that the stream of ordered records contains a plurality of blocks of records and that all records that belong to a transaction are stored contiguously in a single block of records in the plurality of blocks in the stream;

wherein each block of records in the plurality of blocks is assigned a correlation identifier;

receiving, at the source entity, a particular correlation identifier from the sink entity, the particular correlation identifier being used to identifying a particular block of records in the plurality of blocks of records; and sending, starting from the particular block of records, the stream of ordered records from the source entity to the sink entity;

wherein the method is performed by one or more computing devices.

2. The method of claim 1, wherein the source entity is a first data system and wherein the sink entity is a second data system.

3. The method of claim 1, wherein the correlation identifier is unique among all correlation identifiers that are associated with transactions in the plurality of transactions.

4. The method of claim 3, wherein the single block of records contains an end transaction record, and wherein the end transaction record is assigned with the correlation identifier.

5. The method of claim 1, wherein each record in each transaction in the plurality of transactions is associated with a correlation identifier that is unique among all correlation identifiers that are associated with records in transactions in the plurality of transactions.

6. The method of claim 5, wherein the correlation identifier is a system change number.

7. The method of claim 5, wherein the correlation identifier is a byte comparable string.

8. The method of claim 1, wherein a source memory structure is used to store the stream of ordered record at the source entity, wherein only one writer writes to the source memory structure, and wherein only one reader reads from the source memory structure.

9. The method of claim 1, wherein a sink memory structure is used to store the stream of ordered record at the sink entity, wherein only one writer writes to the sink memory structure, and wherein only one reader reads from the sink memory structure.

10. The method of claim 1, wherein the plurality of records is received by a capture process, and wherein the plurality of ordered records is sent to an apply process.

11. The method of claim 10, wherein the capture process and the apply process communicate with each other through a set of routines that implements a set of application programming interfaces (APIs).

12. The method of claim 11, further comprising:
the apply process sending a request to the capture process, wherein the request comprises the particular correlation identifier, and wherein the particular correlation identifier is non-zero; and
the capture process sending records to the apply process, wherein each of the records is associated with a correlation identifier that is no less than the particular correlation identifier.

13. The method of claim 11, further comprising:
the capture process sending a request to the apply process, wherein a correlation identifier field in the request is set with the particular correlation identifier and returned by the apply process; and
the capture process sending records to the apply process, wherein each of the records is associated with a correlation identifier that is no less than the particular correlation identifier, and wherein the particular correlation identifier is a correlation identifier contained in an acknowledgment that the capture process last received from the apply process.

14. The method of claim 1, wherein the capture process avoids taking checkpoints when capturing records from one or more logs at the source entity.

15. A computer-readable storage medium carrying one or more sequences of instructions which, when executed by one or more processors, causes the one or more processors to perform:
receiving, at the source entity, a plurality of records that belong to a plurality of transactions, wherein first records from a first transaction in the plurality of transactions are interleaved with one or more records from one or more different transactions in the plurality of transactions;
ordering the plurality of records into a stream of ordered records such that the stream of ordered records contains a plurality of blocks of records and that all records that belong to a transaction are stored contiguously in a single block of records in the plurality of blocks in the stream;
wherein each block of records in the plurality of blocks is assigned a correlation identifier;
receiving, at the source entity, a particular correlation identifier from the sink entity, the particular correlation identifier being used to identifying a particular block of records in the plurality of blocks of records;
sending, starting from the particular block of records, the stream of ordered records from the source entity to the sink entity.

16. The computer-readable storage medium of claim 15, wherein the source entity is a first data system and wherein the sink entity is a second data system.

17. The computer-readable storage medium of claim 15, wherein the correlation identifier is unique among all correlation identifiers that are associated with transactions in the plurality of transactions.

18. The computer-readable storage medium of claim 17, wherein the single block of records contains an end transaction record, and wherein the end transaction record is assigned with the correlation identifier.

19. The computer-readable storage medium of claim 15, wherein each record in each transaction in the plurality of transactions is associated with a correlation identifier that is unique among all correlation identifiers that are associated with records in transactions in the plurality of transactions.

20. The computer-readable storage medium of claim 19, wherein the correlation identifier is a system change number.

21. The computer-readable storage medium of claim 19, wherein the correlation identifier is a byte comparable string.

22. The computer-readable storage medium of claim 15, wherein a source memory structure is used to store the stream of ordered record at the source entity, wherein only one writer writes to the source memory structure, and wherein only one reader reads from the source memory structure.

23. The computer-readable storage medium of claim 15, wherein a sink memory structure is used to store the stream of ordered record at the sink entity, wherein only one writer writes to the sink memory structure, and wherein only one reader reads from the sink memory structure.

24. The computer-readable storage medium of claim 15, wherein the plurality of records is received by a capture process, and wherein the plurality of ordered records is sent to an apply process.

25. The computer-readable storage medium of claim 24, wherein the capture process and the apply process communicate with each other through a set of routines that implements a set of application programming interfaces (APIs).

26. The computer-readable storage medium of claim 25, wherein the one or more sequences of instructions comprise instructions which, when executed by the one or more processors, causes the one or more processors to further perform:
the apply process sending a request to the capture process, wherein the request comprises the particular correlation identifier, and wherein the particular correlation identifier is non-zero; and
the capture process sending records to the apply process, wherein each of the records is associated with a correlation identifier that is no less than the particular correlation identifier.

27. The computer-readable storage medium of claim 25, wherein the one or more sequences of instructions comprise instructions which, when executed by the one or more processors, causes the one or more processors to further perform:
the capture process sending a request to the apply process, wherein a correlation identifier field in the request is set with the particular correlation identifier and returned by the apply process; and
the capture process sending records to the apply process, wherein each of the records is associated with a correlation identifier that is no less than the particular correlation identifier, and wherein the particular correlation identifier is a correlation identifier contained in an acknowledgment that the capture process last received from the apply process.

28. The computer-readable storage medium of claim 15, wherein the capture process avoids taking checkpoints when capturing records from one or more logs at the source entity.

* * * * *